Jan. 26, 1960  J. J. DELANEY  2,922,288
LIQUID PETROLEUM GAS DISPENSING APPARATUS
Filed Sept. 23, 1954  6 Sheets-Sheet 1

JOHN J. DELANEY
INVENTOR.

BY Albert L. Jeffers
ATTORNEY

Jan. 26, 1960  J. J. DELANEY  2,922,288
LIQUID PETROLEUM GAS DISPENSING APPARATUS
Filed Sept. 23, 1954  6 Sheets-Sheet 2

JOHN J. DELANEY
INVENTOR.

BY Albert L. Jeffers
ATTORNEY

Jan. 26, 1960 J. J. DELANEY 2,922,288
LIQUID PETROLEUM GAS DISPENSING APPARATUS
Filed Sept. 23, 1954 6 Sheets-Sheet 3

JOHN J. DELANEY
INVENTOR.

BY Albert L. Jeffers
ATTORNEY

Jan. 26, 1960   J. J. DELANEY   2,922,288
LIQUID PETROLEUM GAS DISPENSING APPARATUS
Filed Sept. 23, 1954   6 Sheets-Sheet 4

JOHN J. DELANEY
INVENTOR.

BY Albert L. Jeffers
ATTORNEY

Jan. 26, 1960 J. J. DELANEY 2,922,288
LIQUID PETROLEUM GAS DISPENSING APPARATUS
Filed Sept. 23, 1954 6 Sheets-Sheet 6

JOHN J. DELANEY
INVENTOR.

BY Albert L. Jeffers
ATTORNEY

United States Patent Office 2,922,288
Patented Jan. 26, 1960

2,922,288

LIQUID PETROLEUM GAS DISPENSING APPARATUS

John J. Delaney, Fort Wayne, Ind., assignor to Bowser, Inc., Fort Wayne, Ind., a corporation of Indiana Application September 23, 1954, Serial No. 457,967

19 Claims. (Cl. 62—53)

This invention relates to dispensing apparatus conforming in general outward appearance to the type commonly installed at automobile service stations and more particularly it relates to a dispenser for liquid petroleum gas.

In the very recent past L.P. gas has become an important fuel for automobiles and trucks. Commercial L.P. gas boils or vaporizes at atmospheric pressure and temperatures, it is, therefore necessary that pressure be maintained on the liquid at every point in the system to prevent vaporization. Also, if partial vaporization of the liquid occurs before its delivery to the meter, the meter will operate partly on vapor and will give volume indications in excess of the true volume of liquid actually passed through the meter.

The primary object of my invention is to provide a practical dispenser for L.P. gas, which will meet the critical pressure requirements, which will satisfy the safety requirements, and which will be practical both for manufacture and in use.

Another object of the invention is to provide a L.P. gas dispenser that may be installed in service stations handling both types of motor fuel.

Another object of this invention is to provide a L.P. gas dispenser for fueling of trucks, busses and passenger type vehicles. The dispenser may, also, be used for filling domestic type cylinders.

Another object of the invention is to provide means for venting vapors back to the supply tank and thus allowing only liquid flow through the measuring parts which will result in true and accurate measurement of the L.P. gas dispensed.

Another object of the invention is to provide interlocking means for controlling the flow of liquid gas in multiple installations.

A further object of the invention is to provide the dispenser with excess flow control means at points in the dispenser most likely to be damaged or broken.

Another object of the invention is to provide means for venting the liquid gas trapped between the nozzle and the check valve on the tank being filled upon the completion of a dispensing operation.

A further object of the invention is to provide a new and improved liquid dispensing system and more particularly to such a system especially adapted for liquid petroleum gas.

A still further object of the invention is to provide means to protect the dispenser from any excessive pressure which may build up from expansion of the L.P. gas.

A salient object of the invention is the provision of means to prevent the liquid gas in the dispenser from flashing into a vapor when the dispensing nozzle is first attached to an empty tank and the filling cycle is started.

Another object of the invention is to provide means for blowing down the lines in the dispenser when service to one of the various components of the dispenser is necessary.

A further object of the invention is the provision of a nozzle boot for enclosing the nozzle tip and for storing the hose when not in use.

A still further object of the invention is to provide means for measuring and disclosing the storage tank vapor pressure and the liquid gas discharge pressure.

Further objects, features and advantages of this invention will become apparent from the following description and claims when read in view of the drawings, in which;

Figures 1, 10, 11:
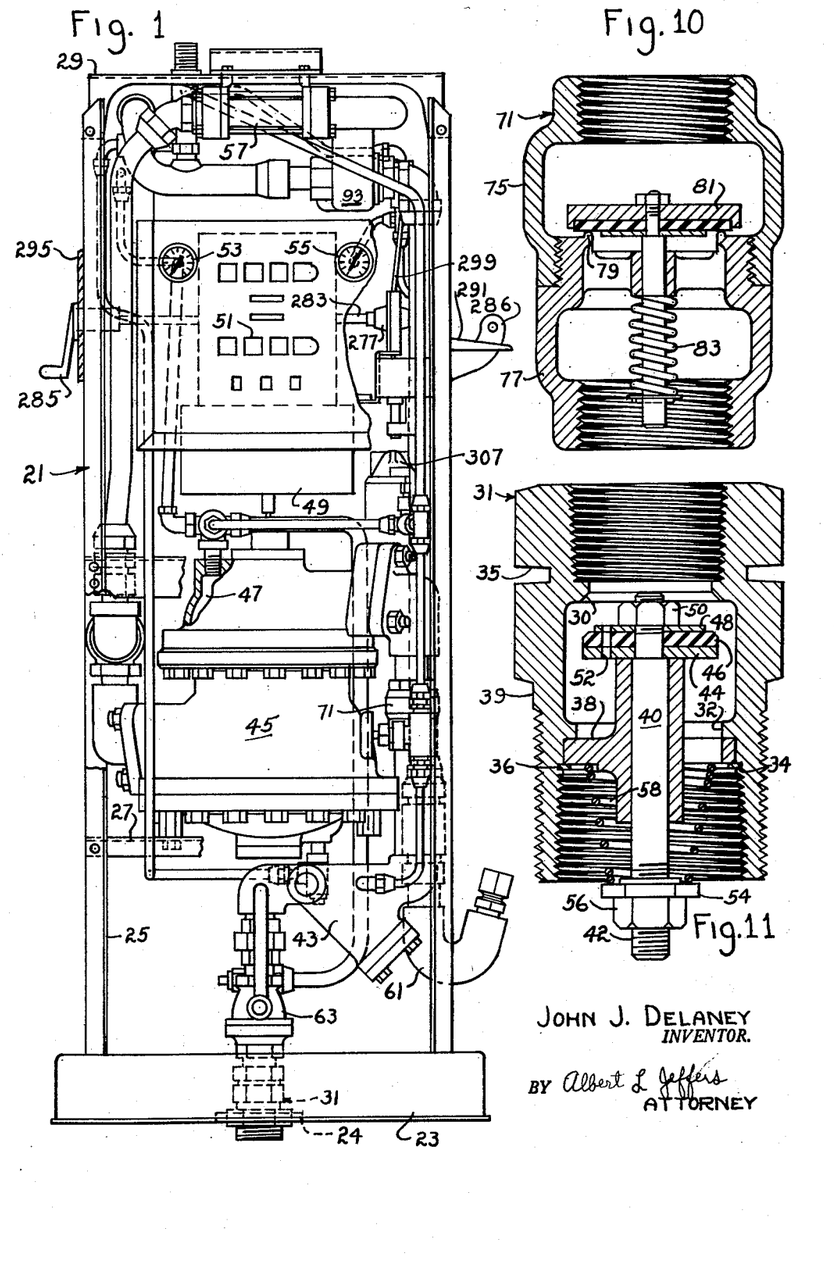
Figure 1 is a front elevation, with parts removed, partly diagrammatic and sectional in form, of a L.P. gas dispensing apparatus embodying the features of the invention.
Figure 10 is a sectional view of the check valve assembly.
Figure 11 is a sectional view of the excess flow valve disposed in the pump discharge line and including a weak section at the outlet end.
Figures 2, 6, 8:
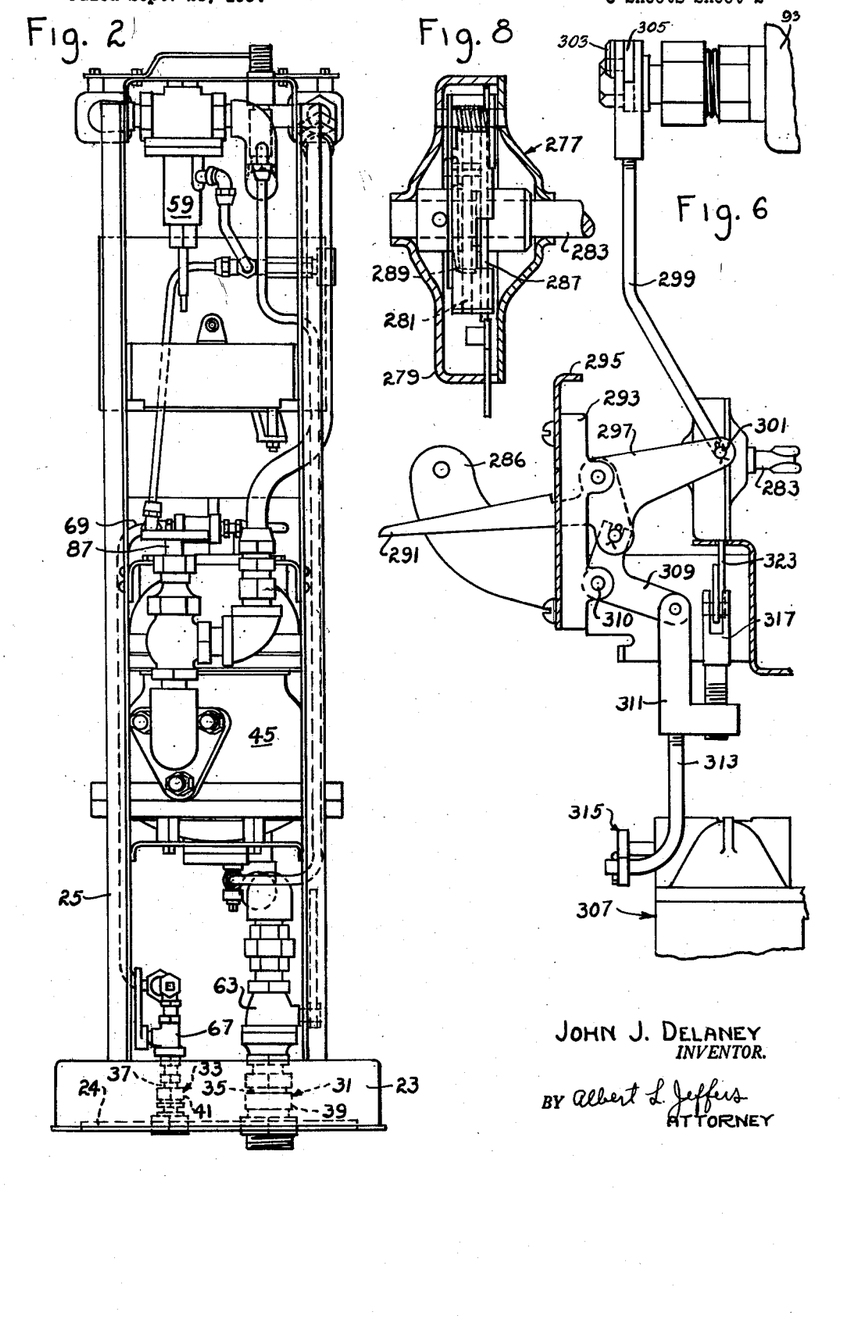
Figure 2 is an elevation of the dispensing apparatus of Figure 1 taken from the left with the housing removed.
Figure 6 is a side elevation of the interlock mechanism and linkage thereof.
Figure 8 is a section view of the interlock mechanism taken on line 8—8 of Figure 7.

Referring more specifically to the drawings, in Fig. 1 and Fig. 2 there is set forth for illustrative purposes a L.P. gas dispensing apparatus of the type which may be employed in automobile filling stations and the like, arranged for pressure controlled actuation. The number 21 designates a dispensing apparatus having a base 23 provided with a sub base plate 24 and a frame 25 having cross members 27 and 29.

Mounted rigidly on the sub base plate 24 are excess flow check valves 31 and 33. The sub base plate 24 is adapted to be anchored solidly to a concrete island (not shown).

As shown in Fig. 11, the excess flow valve 31 comprises a valve body 39 having a weakness groove 35. The valve body 39 is provided with a valve seat 30, a flange 32 and a groove 34 for receiving a retaining ring 36. The cage 38 is adapted to be mounted between the flange 32 and retaining ring 36 and is provided with a bore 40 for slideably receiving the poppet valve stem 42. One end of the poppet valve stem is provided with a washer 44, poppet disc 46, washer 48 and lock nut 50. A port 52 is provided in the poppet disc 46 and washers 44 and 48. The other end of the poppet valve stem 42 is provided with an adjusting nut 54 and a hex nut 56. A spring 58 is mounted between cage 38 and the adjusting nut 54 and is adapted to hold the valve open under normal operations. In the event of a collision wherein the dispensing apparatus 21 is knocked off the island, the valve body would break at the groove 35 which is above the valve assembly proper and when the flow of gas reaches approximately 40 gallons per minute the valve will close thus preventing the L.P. gas from escaping from the supply.

Figures 14, 15:
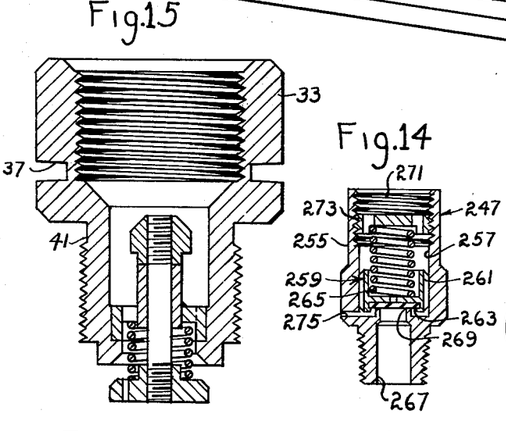
Figure 14 is a sectional view of the safety relief valve.
Figure 15 is a sectional view of the excess flow valve disposed in the vapor return line and including a weak section at the inlet end.

As shown in Figure 15, the excess flow valve 33 comprises a valve body 41 having a weakness groove 37. The function of the valve and the valve assembly is similar to valve 31 except that the valve is adapted to close when the flow of gas reaches 20 gallons per minute.

Mounted on the frame and having conventional liquid and mechanical connections is a strainer 43, a meter 45 having a vapor separating chamber 47, a register having dials 51 and pressure gauges 53 and 55, sight glasses 57, differential pressure flow regulator 59, and a discharge pipe or conduit 61.

A ball type shut off valve 63 is mounted in the pump discharge line 65 and a similar valve 67 is mounted in the vapor return line 69. The valves 63 and 67 are normally open but are closed when it is desired to stop the flow of gas to the dispenser for a period of time.

As shown in Figures 1 and 10, a one way check valve 71 is mounted in line 73 between the strainer 43 and meter 45. The check valve 71 is of conventional construction having an upper part 75 and a lower part 77 provided with a valve seat 79 and a poppet valve 81 which is adapted to be held closed by spring 83. It is preferred to set the valve 71 to open between 3 and 4 pounds of pressure.

The meter 45 mechanism is preferably of the type shown in the patent to R. B. Pressler No. 2,625,914 except that the upper portion is enlarged to provide a vapor separating chamber 47 which is connected to the supply tank 85 through vapor return line 87, an orifice fitting 89 having a small bore 91, line 69, valve 67, and valve 33.

The meter 45 is connected to the main control or gate valve 93 through lines 95, 101, 103 and 249, said lines include a globe valve 97, a conventional excess flow valve 99, sight glasses 57, and differential pressure flow regulator 59.

Figure 9:
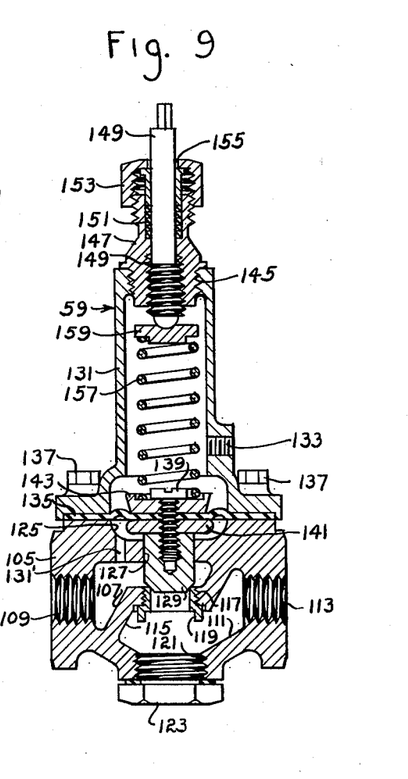
Figure 9 is a sectional view of the differential pressure flow regulator.

As shown in Fig. 9, the differential pressure flow regulator 59 comprises a body 105 provided with an inlet chamber 107 having an inlet 109 and an outlet chamber 111 having an outlet 113.

In the intermediate portion of the body 105 and between the chamber 107 and chamber 111 is a partition 115 provided with a threaded opening 117 for receiving a threaded valve seat 119. The bottom portion of chamber 111 is provided with a threaded opening 121 for receiving a threaded plug 123. The top portion of the body 105 is provided with a chamber 125 having an opening 127 for slideably receiving a valve member 129. A bore 131' connects chamber 107 with chamber 125.

A hollow casing 131 having an inlet 133 is mounted on the top portion of the body 105 with a diaphragm 135 mounted therebetween. The casing is secured to the body 105 by lugs or studs 137. The valve member 129 is connected to the diaphragm 135 by the screw 139 and washers 141 and 143.

The top portion of the casing is provided with an opening 145 adapted to receive a bonnet 147 having a threaded bore for an adjusting screw 149. The bonnet is provided with a packing gland 151 and a cap 153 having an opening 155 for the adjusting screw 149. A spring 157 is disposed inside the casing between washer 143 and washer 159 for normally holding the valve member 129 in a closed position.

The control valve 93 is connected to the nozzle 161 through line 163, a conventional excess flow valve 165, line 61, a coupling 169 having a weakness groove 171, and hose 173.

The coupling 169 protects the dispenser in the event that a customer drives away while the nozzle is still attached to the tank. In such event the coupling will break at the groove 171 and the excess flow check valve 165 will immediately close thus preventing loss of liquid in excess of the amount contained in the hose 173.

Figure 12:
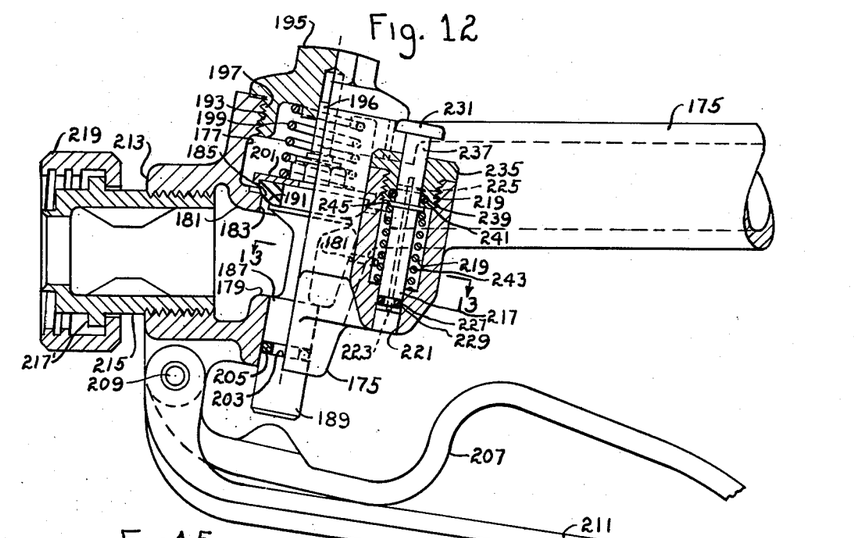
Figure 12 is a sectional view of the dispensing nozzle.

As shown in Fig. 12, the nozzle comprises a body 175 having an inlet chamber 177 and an outlet chamber 179.

In the intermediate portion of the body 175 and between the chamber 177 and chamber 179 is a partition 181 provided with an opening 183 and a valve seat 185. The bottom portion of chamber 179 is provided with an opening 187 for receiving a valve stem 189 having a valve disc 191 adapted for valve seat 185.

The top portion of chamber 177 is provided with a threaded opening 193 adapted to receive a bonnet 195 having a threaded portion 197. The valve 191 is normally held closed by a spring 199 mounted between the bonnet 195 and washer 201. A stem 196 is mounted on the washer 201 for limiting the vertical movement of valve 191. The valve stem 189 is provided with a groove 203 for receiving a gasket or sealing ring 205 and the stem is adapted to extend beyond the body 175 for contact with an operating lever 207 which is pivotly mounted at 209 on the body 175 having a guard member 211.

The outlet chamber 179 is provided with a threaded opening 213 for receiving a threaded coupling 215 having an exterior flange 217', which functions to hold the coupling nut 219 on the coupling 215.

Figure 13:
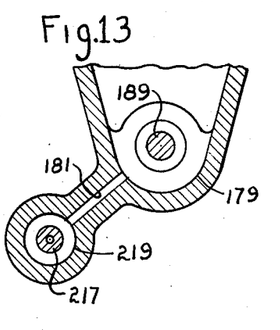
Figure 13 is a sectional view of the nozzle vent taken substantially on line 13—13 in Figure 12.

The nozzle is provided with a bleed valve 217 which comprises a chamber 219 and is in communication with chamber 179 by a bore or passage 181. The bottom portion of chamber 219 is provided with an opening 221 for slideably receiving the valve stem having a longitudinal bore 223 and a vertical bore 225. The lower part of the stem is provided with a groove 227 adapted to receive a gasket or sealing ring 229. The top portion of the stem is provided with a button 231. The upper portion of chamber 219 is provided with a threaded opening 233 for receiving a threaded cap 235 having a bore 237 provided with a radial groove 239 for receiving a gasket or sealing ring 241. The valve is normally held closed by a spring 243 mounted between flange 245 and the bottom portion of chamber 219.

A safety relief valve 247 is connected to line 249 between the flow regulator 59 and the control valve 93 through line 251. The safety relief valve 247 is, also, connected to the meter 45 through line 251 and branch line 253.

As shown in Fig. 14, the safety relief valve 247 comprises a valve body 255 having a bore 257 adapted to receive the poppet valve assembly 259, which consists of a valve cage 261, disc 263 and a spring 265. One end of the valve body is provided with a bore 267 which terminates in a valve seat 269 for the poppet valve 259. The other end of the valve body is provided with an adjusting screw 271 having spaced openings 273. The valve body 255 is provided with a weep opening 275 for draining liquid or moisture from the bore 257.

Figure 7:
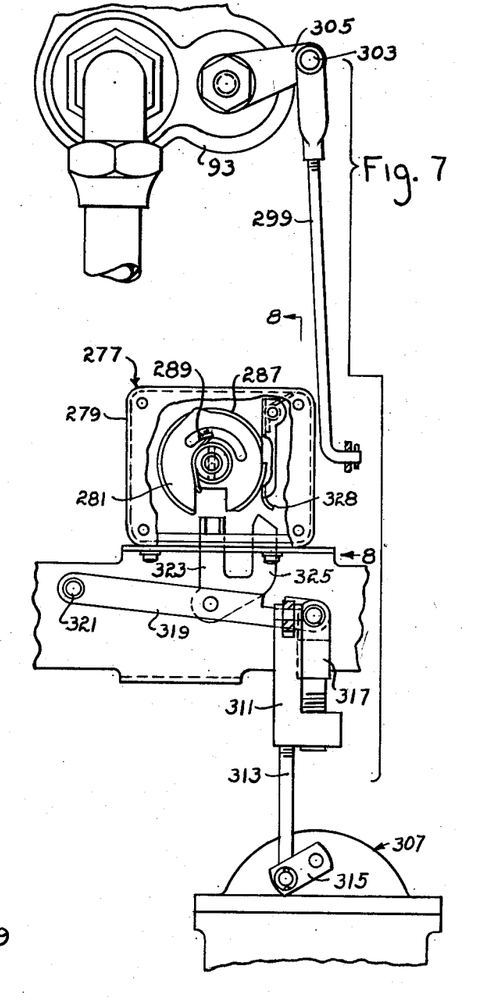
Figure 7 is an elevation with parts broken away, partly in section, of the interlock mechanism and linkage thereof.

The interlock mechanism, generally indicated by the number 277, as shown in Figures 6, 7 and 8, comprises an interlock box 279 having a disc 281 connected to be rotated in a clockwise direction (Fig. 1) by crank 285 while the registers 51 are being reset to zero position before a dispensing operation is begun. Motion is transmitted from disc 281 to disc 287 by means of a spring 289 which has one end attached to disc 281 and its other end attached to disc 287.

A control lever 291 is pivoted at one end to a member 293, while its other end projects through an opening in the housing 295. The lever 291 is provided with a projection 297. A rod 299 has one end connected at 301 to the projection 297 and has its other end connected at 303 to an operating lever 305. The above linkage is adapted to open and close the control valve 93. When the lever 291 is in its farthest counter clockwise position as shown in Fig. 6 the valve 93 is closed; however, when the lever 291 is rotated to its farthest clockwise position the valve 93 is open.

The lever 291 is connected to the motor switch 307 through a bell crank 309, which is pivotally connected at 310 to the member 293, switch yoke 311, rod 313 and linkage 315.

The motor switch is operatively connected to the interlock mechanism 277, through linkage 315, rod 313, yoke 311, adjustment screw 317, interlock bar 319 which is pivotally connected at 321, interlock bolt or seeker 323 having a cam 325 adapted to operate pawl 327.

This seeker and the interlock mechanism are fully disclosed in the Patent Number 2,299,894, issued October 27, 1942 to C. P. Griffith for "Control Mechanism for Liquid Dispensing Apparatus" and no detail explanation of its construction and operation is believed to be necessary.

The register reset crank 285 is located on the pump housing on the side opposite the nozzle support 286 and connected to reset the register and to recondition the interlock mechanism in a manner commonly known in the art.

Figure 5:
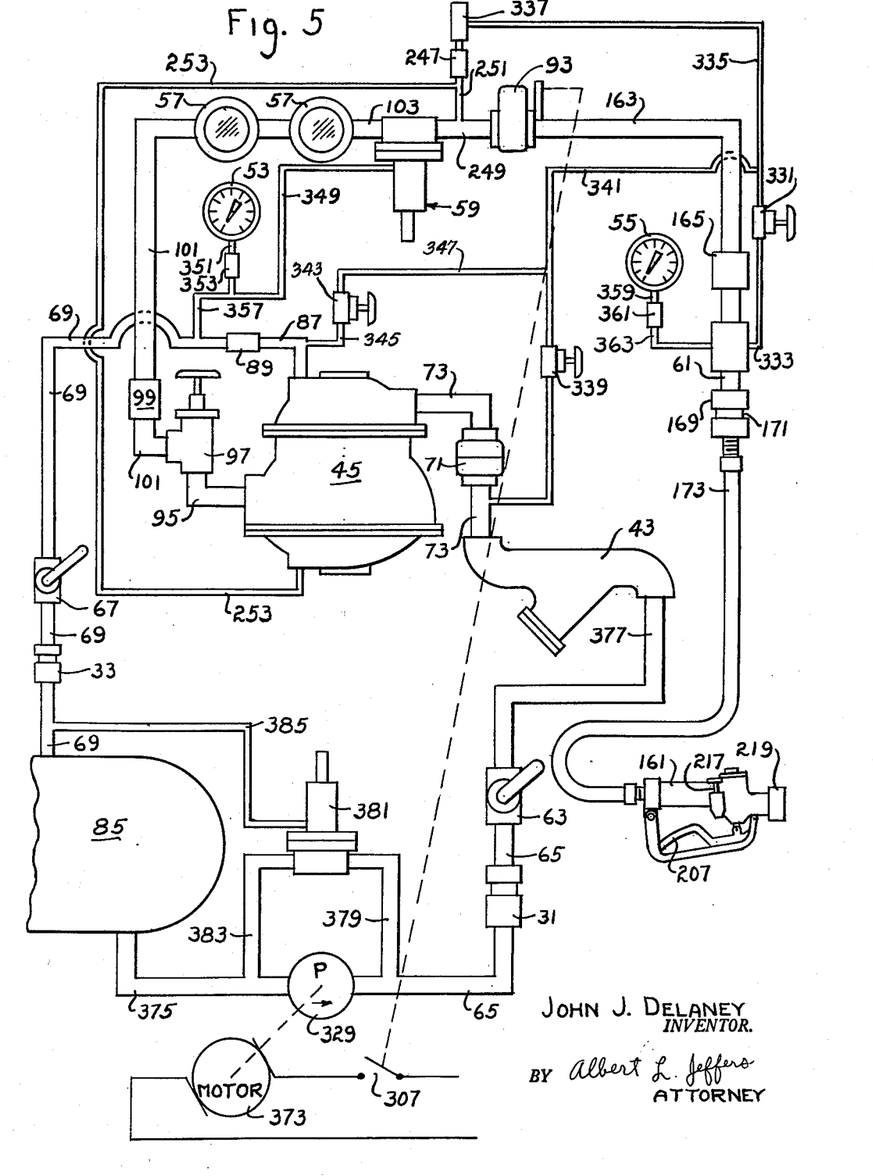
Figure 5 is a diagram of the dispensing system including the blow down tubing and motor wiring diagram.

As shown in Fig. 5 the system is provided with blow lines to vent the liquid gas from the dispenser to the atmosphere in the event service is required on the meter, strainer or to change the hose or nozzle. To change the hose or nozzle the supply pump 329 is closed down by rotating the lever 291 counter-clockwise which closes control valve 93. The hose and piping to the control valve 93 is then vented to the atmosphere by opening valve 331 which permits the gas to escape through line 333, valve 331, line 335 and vent adapter 337. To disassemble and clean the strainer 43 the dispenser is closed down as set forth above and the valve 63 is closed. When the supply pump is closed down the check valve 71 is in a closed position. The strainer is then vented by opening valve 339 which permits the gas to escape from the strainer through line 341, valve 339, lines 341, 335 and vent adapter 337. To vent the meter 45 the supply pump is closed down as disclosed above and the valves 63, 67 and 97 are closed. The meter is then safely vented to the atmosphere by opening valve 343 which permits the gas to escape from the meter through line 345, valve 343, lines 347, 341, 335 and vent adapter 337.

The flow regulator 59 is connected to the storage tank 85 through the casing inlet 133, lines 349, 69 and valve 33.

Figure 16:
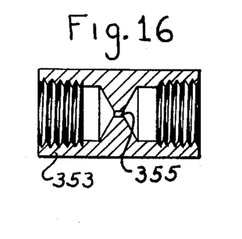
Figure 16 is a sectional view of the orifice fittings to the gauges.
Figure 17:
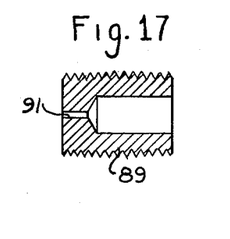
Figure 17 is a sectional view of the orifice fitting disposed in the vapor return line.

The pressure gauge 53 is connected to the supply tank through line 351, orifice fitting 353 having a .005 diameter orifice 355 (Figure 16) as required by the National Board of Fire Underwriters for gauge protection, line 357 and line 69. The pressure gauge 55 is connected to the discharge pipe 61 through line 359, an orifice fitting 361, which is of the same construction as orifice fitting 353, and line 363.

Figure 3:
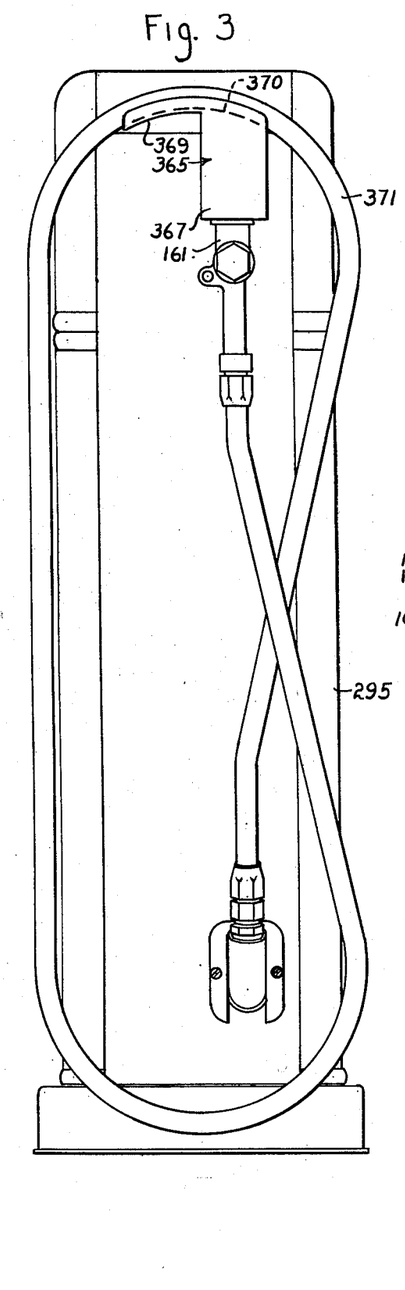
Figure 3 is an elevation of the dispensing apparatus of Figure 1 taken from the right.
Figure 4:
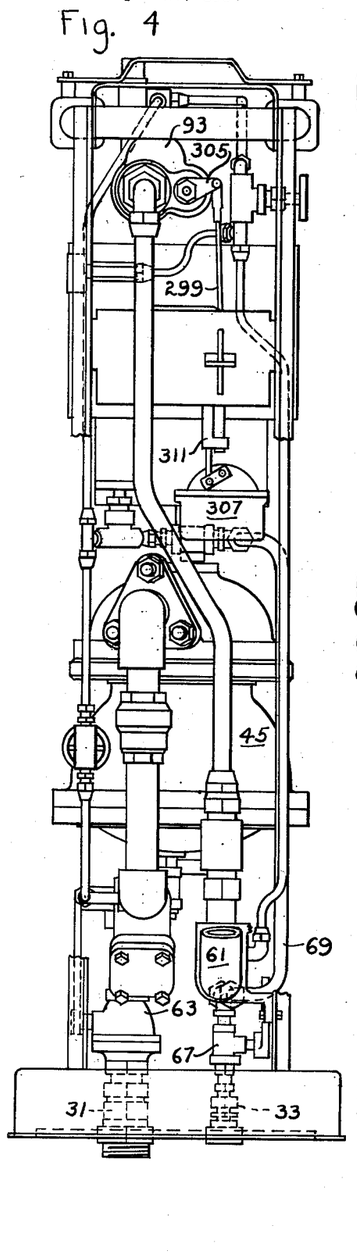
Figure 4 is an elevation of the dispensing apparatus of Figure 1 taken from the right with the housing removed.

The dispenser is provided with a hollow nozzle boot 365 as shown in Fig. 3, mounted on the housing 295. As illustrated, the boot is adapted to serve as a canopy for the nozzle when the dispenser is not in operation. The boot comprises a hollow casing 367 with an opening in the bottom portion for receiving part of the nozzle 161. The top portion of the boot is provided with an integrally formed annular trough 369 which is longitudinally curved to conform to the curvature of the hose loop 371 and functions to store the hose when the dispenser is not in use.

*The operation*

Assuming that the valves 63, 67 and 97 are open and that the tank 85 contains a supply of L.P. gas, the operator will initiate the dispenser operation by resetting the register 51 to zero, which is accomplished by rotating the crank 285. This conditions the interlock mechanism so that the motor switch 307 may be closed upon actuation of the lever 291 in an upward direction. The nozzle 161 is removed from the support 286 and attached to the tank which is to be filled.

The upward movement of the lever 291 opens the control valve 93 through projection 297, rod 299 and lever 305. This action also, starts the pump motor 373 by closing the motor switch 307 through actuation of the bell crank 309, yoke 311 and linkage 315. The operator then opens the nozzle valve 191 by actuating lever 207 and controls the flow of gas during the dispensing cycle from this point.

After the tank has been filled and before the nozzle 161 can be safely disconnected, the gas that is trapped between the valve 191 and the check valve on the tank being filled is vented to the atmosphere by compressing the thumb operated vent valve 217, which permits the gas to escape through bore or passage 181, chamber 219, bore 245 and bore 223.

After the gas in the nozzle has been vented the nozzle may be safely disconnected and placed back on the support 286. The motor switch is opened and the valve 93 is closed by moving the lever 291 downward, which can be done manually or by the nozzle when it is placed on the support 286.

A more clear understanding of the many operating features of the dispenser may be had by referring to the flow chart illustrated in Fig. 5.

Let it now be assumed that the nozzle 161 is connected to the tank to be filled and the register 51 has been reset to zero. The pump 329 is placed in operation by moving the lever 291 upward as previously described. Under this condition, the L.P. gas from the storage tank 85 is supplied to the inlet of the meter 45 at a pressure exceeding the vapor pressure in the storage tank through the pump inlet line 375, pump 329, discharge line 65, excess flow check valve 31, main supply valve 63, line 377, strainer 43, line 73 and single direction check valve 71.

In the event vapor is present in the liquid, the vapor will raise in chamber 47 and will be carried back to the storage tank 85 through line 87 orifice fitting 89 and line 69.

The metered gas flows from the meter 45 to the nozzle 161 through the meter discharge line 95, valve 97, line 101, excess flow valve 99, sight glasses 57, differential pressure flow regulator 59, control valve 93, line 163, excess flow valve 165, line 61, coupling 169 and hose 173.

One side of the diaphragm in the regulator 59 is connected to the storage tank 85 through lines 349 and 69. The regulator is, also, spring loaded with a maximum differential setting of 20 p.s.i. and maintains sufficient back pressure on the meter and sight glasses to prevent the liquid gas in the dispenser from flashing into a vapor when the filling cycle is first started after the nozzle has been attached to an empty tank. In order for the regulator valve 129 to open, the pump 329 must create a pressure in excess of the spring load and storage tank vapor pressure which is applied above the diaphragm 135 whereupon the the diaphragm will be expanded to open valve 129 by the pump pressure exerted through chamber 107, port 131' and chamber 125.

The pump 329 is provided with a by-pass through line 379, differential pressure flow regulator 381 having the same characteristics and structure as the regulator 59, and line 383. One side of the diaphragm in the regulator 381 is connected to the storage tank 85 through lines 385 and 69. In order for the regulator valve to open, the pump must create a pressure in excess of the spring load and storage tank vapor pressure applied above the regulator diaphragm.

Although I have described the invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim to be new and desire to protect by Letters Patent of the United States is:

1. In a liquid measuring and dispensing apparatus for liquid pressure gas, comprising, a storage tank for liquid pressure gas, a pump having a suction conduit connected to the storage tank and a discharge conduit provided with an excess flow valve having a weakness groove; a strainer having an inlet connected to said discharge conduit and an outlet, a meter including a vapor separating chamber having an outlet connected to a return conduit for communication with said storage tank, a conduit provided with a single direction check valve having one end connected to said strainer outlet and having its other end connected to the vapor separating chamber, said single direction check valve adapted to allow flow from the strainer to the separating chamber, a differential pressure flow regulator having an inlet and an outlet, a conduit provided with an excess flow check valve having one end connected to said meter and having its other end connected to the flow regulator inlet, said regulator having valve means disposed between the inlet and outlet, said valve means adapted to be actuated to an open position when said regulator inlet is filled with liquid under pressure greater than the pressure in the storage tank; a coupling having a weakness groove, a conduit provided with an excess flow check valve having one end connected to the regulator outlet and having its other end connected to said coupling, a discharge nozzle and a hose having one end connected to the nozzle and the other end connected to said coupling.

2. Liquid dispensing apparatus, as claimed in claim 1 having a shut off valve disposed in the discharge conduit between the excess flow valve and the strainer and a shut off valve disposed in the return conduit between the meter and the storage tank.

3. Liquid dispensing apparatus as claimed in claim 1, in which the return conduit is provided at one end with an excess flow valve having a weakness groove and at the other end with an orifice fitting having a small bore therein which permits the vapor to return to the storage tank.

4. A liquid dispensing apparatus, as claimed in claim 1, having a by-pass conduit with one end connected to the discharge conduit and having its other end connected to the suction conduit, a second differential pressure flow regulator disposed in said bypass conduit, said second regulator provided with valve means, said valve means adapted to be actuated to an open position when the pressure in the by-pass line is greater than the pressure in the storage tank.

5. Liquid dispensing apparatus, as claimed in claim 1, in which the discharge nozzle is provided with means for connection with a receptacle to be supplied, a valve body, a manually operable valve means in said valve body and means to vent the liquid trapped in the nozzle to the atmosphere when the nozzle is to be disconnected from the receptacle.

6. In an apparatus for dispensing liquified petroleum gases comprising, in combination a supply line adapted to be connected to a storage tank, a manually operable dispensing control valve connected to said supply line, a pump in said line for developing pressure on the liquid gas in said line and causing dispensing flow when the manually operable dispensing control valve is open and a meter disposed in said line, said meter being provided with a vapor chamber adapted for communication with the storage tank, said meter actuated by the flow of liquid through the supply line, a differential pressure flow regulator in communication with the meter, said regulator adapted to permit the flow of liquid only when the supply pressure is greater than the pressure in the storage tank and an excess flow valve disposed in said supply line between the pump and meter.

7. In combination with a liquified petroleum gas dispensing line adapted to be connected to a storage tank, liquid measuring means in said line, register means, a mechanism controlled by said liquid measuring means for operating said register means in accordance with the actuation of the liquid measuring means, said line having a manually operable dispensing control valve and a pressure flow regulator means in said line between the measuring means and control valve, said regulator means adapted to permit the flow of liquid when the dispensing pressure is greater than the pressure in the storage tank.

8. The combination comprising a liquified petroleum gas dispensing mechanism adapted to be connected to a storage tank and including a dispensing line having a manually operable dispensing control nozzle, means for developing pressure on the liquid gas in said line, a meter actuated by the dispensing flow, a register driven by the meter, a pressure flow regulator means disposed in said line between the meter and nozzle, said regulator means adapted to permit the flow of liquid when the dispensing pressure is greater than the pressure in the storage tank, and said line provided with an excess flow valve between the regulator means and nozzle and a coupling disposed in the line between the excess flow valve and nozzle having a weakness groove which is adapted to break in the event excess force is applied.

9. The combination comprising a liquified petroleum gas dispensing mechanism adapted to be connected to a storage tank and including a dispensing line having a manually operable dispensing control nozzle, means for developing pressure on the liquid gas in said line, liquid measuring means including vapor separator means connected to said dispensing line, a register, means controlled by the actuation of the liquid measuring means for actuating said register, valve means for preventing excessive flow of liquid disposed in said line between the meter and nozzle, regulator means adapted to allow flow of liquid in said line when the dispensing pressure is greater than the pressure in the storage tank and means for venting said control nozzle upon completion of the dispensing operation.

10. The combination comprising a liquified petroleum gas dispensing mechanism including a dispensing line having a manually operable dispensing control nozzle, pump means for developing pressure on the liquid gas in said line, said pump means adapted to be connected to a storage tank, liquid measuring means including vapor separator means connected to said dispensing line, a register, means controlled by the actuation of the liquid measuring means for actuating said register, valve means disposed in said line between the pump and nozzle for preventing excessive flow of liquid therein, regulator means adapted to allow flow of liquid in said line when the dispensing pressure is greater than the pressure in the storage tank, a safety relief valve disposed in said line between said regulator and said nozzle and means for venting the control nozzle upon completion of the dispensing operation.

11. In a liquified petroleum gas dispensing system, the combination of a dispensing line adapted to be connected to a storage tank containing liquid gas means for propelling liquid gas through the dispensing line, power means for operating the propelling means, liquid measuring means connected to said dispensing line, registering means, means controlled by said liquid measuring means for actuating said registering means, interlock means cooperating with the registering means for controlling the power means, a dispensing nozzle means connected to the dispensing line and regulator means disposed in the dispensing line between the nozzle means and the measuring means to permit the flow of liquid in the line only when the dispensing pressure is greater than the pressure in the storage tank.

12. A liquified petroleum gas dispensing apparatus comprising a dispensing line adapted to be connected to a storage tank containing liquid gas, means for propelling liquid gas through the dispensing line, power means for operating the propelling means, bypass means for the propelling means, said by-pass means adapted to operate when a predetermined pressure is reached in the dispensing line, liquid measuring means connected to said dispensing line, a dispensing control nozzle means connected to the dispensing line and regulator means connected in the dispensing line between the nozzle means and the measuring means to permit the flow of liquid in the line only when the dispensing pressure is greater than the pressure in the storage tank.

13. A liquid pertroleum gas dispenser comprising a frame having a base member, a first excess flow valve provided with a weakness groove extending from said base member, a meter, a first conduit connecting the first excess flow valve with the meter, said first conduit having a normally open valve and a single direction check valve said single direction check valve adapted to allow flow in the direction of the meter, a differential pressure flow regulator having an inlet and an outlet, a second conduit leading from the meter to the regulator inlet, said second conduit having a normally open valve and an excess flow valve, a second excess flow valve provided with a weakness groove extending from the base member, a vapor return conduit provided with an orifice fitting having a small bore and a normally open valve leading from the second excess flow valve to the meter, a coupling having a weakness groove and a third conduit having an excess flow valve leading from the regulator outlet to the coupling.

14. A liquid petroleum gas dispenser comprising a frame having a base member, a meter having a vapor chamber, an inlet conduit adapted to be connected to a storage tank, said inlet conduit having a normally open valve and a single direction check valve and connected to said meter, vapor means including a conduit provided with an orifice fitting having a small bore and a normally open valve connected to said vapor chamber for venting the vapor, a differential pressure flow regulator, a meter discharge conduit having a normally open valve and an excess flow valve leading from the meter to the regulator, a coupling having a weakness groove and an outlet conduit having an excess flow valve leading from the regulator to the coupling.

15. Liquid dispensing apparatus, as claimed in claim 14, having a relief valve, a relief valve conduit leading from said relief valve to the outlet conduit and a conduit leading from the meter to the relief valve conduit.

16. Liquid dispensing apparatus, as claimed in claim 14, having a vent adapter, a first blow down means including a conduit having a normally closed valve in communication with the vent adapter and outlet conduit, a second blow down means having a normally closed valve in communication with the inlet conduit and vent adapter and a third blow down means including a conduit having a normally closed valve in communication with the meter discharge conduit and vent adapter.

17. Liquid dispensing apparatus, as claimed in claim 14, having a gage conduit in communication with the regulator and vapor conduit and a first pressure gage connected to said gage conduit, said first gage adapted to indicate the storage tank pressure, a second pressure gage connected to said outlet conduit, said second gage adapted to indicate the discharge pressure of the liquid.

18. A liquid petroleum gas dispenser comprising, in combination, a frame having a base member, a meter having a vapor chamber, an inlet conduit adapted to be connected to a storage tank, said inlet conduit having a normally open valve and connected to said meter, vapor means including a conduit having restriction means and a normally open valve connected to said vapor chamber for venting the vapor, a pressure flow regulator having an inlet and outlet, a meter discharge conduit leading from the meter to the regulator inlet, a register having an indicator dial, said register adapted to be operated by the meter, a coupling having a weakness groove, an outlet conduit having an excess flow valve leading from the regulator outlet to the coupling, a first pressure gage means adapted to indicate the pressure in the supply tank, a second pressure gage means adapted to indicate the pressure in the outlet conduit, a housing about the frame having an opening therein for receiving the indicator dial and said pressure gages.

19. A liquid petroleum dispenser comprising, in combination, a frame having a base member, a housing about the frame, a meter, an inlet conduit connected to said meter, a register adapted to be driven by the meter, a pressure flow regulator, a meter discharge conduit leading from the meter to the regulator, an outlet conduit connected to the regulator, said outlet conduit having a control valve, interlock means including means connected to said control valve and register to control the opening and closing of the valve.

References Cited in the file of this patent

UNITED STATES PATENTS

| D. 151,686 | Ferguson | Nov. 9, 1948 |
| 1,565,066 | Dourson | Dec. 8, 1925 |
| 2,441,706 | Kirkby | May 18, 1948 |